United States Patent [19]

Collinsworth

[11] 4,444,295

[45] Apr. 24, 1984

[54] SPRING/PISTON BRAKE DEVICE

[76] Inventor: John R. Collinsworth, 11240 Trail Dr., Mesquite, Tex. 75149

[21] Appl. No.: 313,259

[22] Filed: Oct. 21, 1981

[51] Int. Cl.³ .............................................. B65H 59/10
[52] U.S. Cl. ...................................... 188/67; 188/152; 188/167; 188/295; 267/167; 267/177
[58] Field of Search ............... 188/152, 295, 294, 292, 188/290, 302–306, 141, 80, 67, 166–167, 378–380, 129, 130, 272; 267/177, 166, 167, 170–175, 60, 61

[56] References Cited

U.S. PATENT DOCUMENTS

| | | | |
|---|---|---|---|
| 1,435,499 | 11/1922 | Ricker | 188/295 |
| 1,487,347 | 3/1924 | Martin | 188/295 |
| 1,548,991 | 8/1925 | Giovannini | 188/295 |
| 1,899,294 | 2/1933 | Roeder | 188/295 |
| 2,001,585 | 5/1935 | Roeder | 188/295 |
| 2,238,786 | 4/1941 | Warman | 188/294 |
| 2,499,099 | 2/1950 | Kenyon | 188/295 |
| 2,548,919 | 4/1951 | Stevens et al. | 188/295 |
| 2,703,219 | 3/1955 | Henshaw | 188/294 |
| 3,026,974 | 3/1962 | Gouker | 188/295 |
| 3,033,322 | 5/1962 | Hughes | 188/295 |
| 3,503,473 | 3/1970 | Hackett | 188/295 |

Primary Examiner—Douglas C. Butler
Attorney, Agent, or Firm—Bernhard Kreten

[57] ABSTRACT

A brake for retarding rotation of a powered shaft in which the shaft includes a crankshaft section having opposed pistons disposed on the crank section, pistons oriented in respective laterally extending cylinders, sections of the cylinder on a side of the piston remote from the crankshaft provided with springs operatively abutting against a face of the piston to alter the resistance against the piston, and a hydraulically actuated device for increasing the spring pressure applied on the piston face so that when the hydraulic device is actuated, the piston meets increasing resistance to continue motion in the cylinder away from the crankshaft, in such a manner that rotation of the shaft is retarded in precise amounts.

6 Claims, 3 Drawing Figures

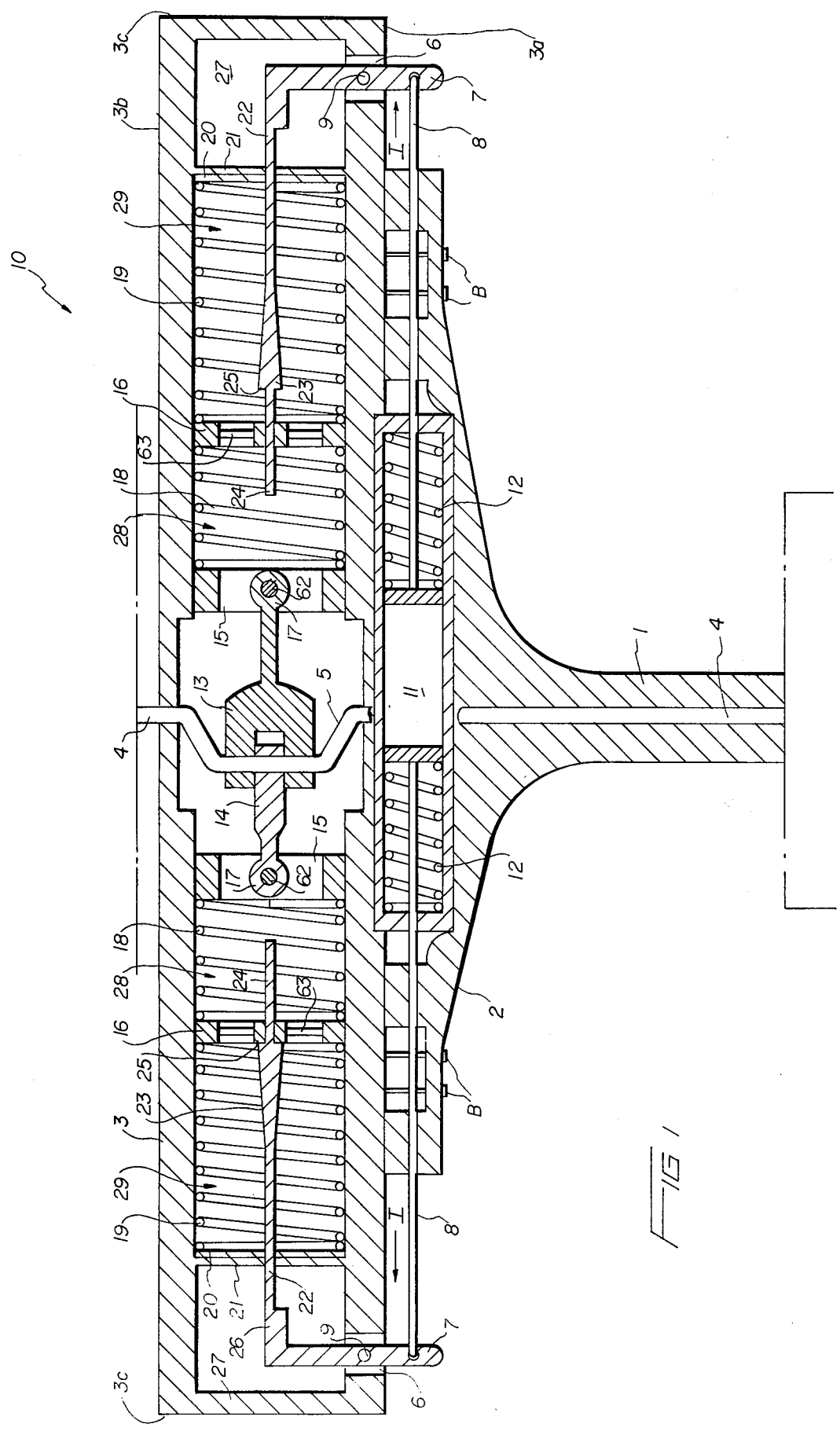

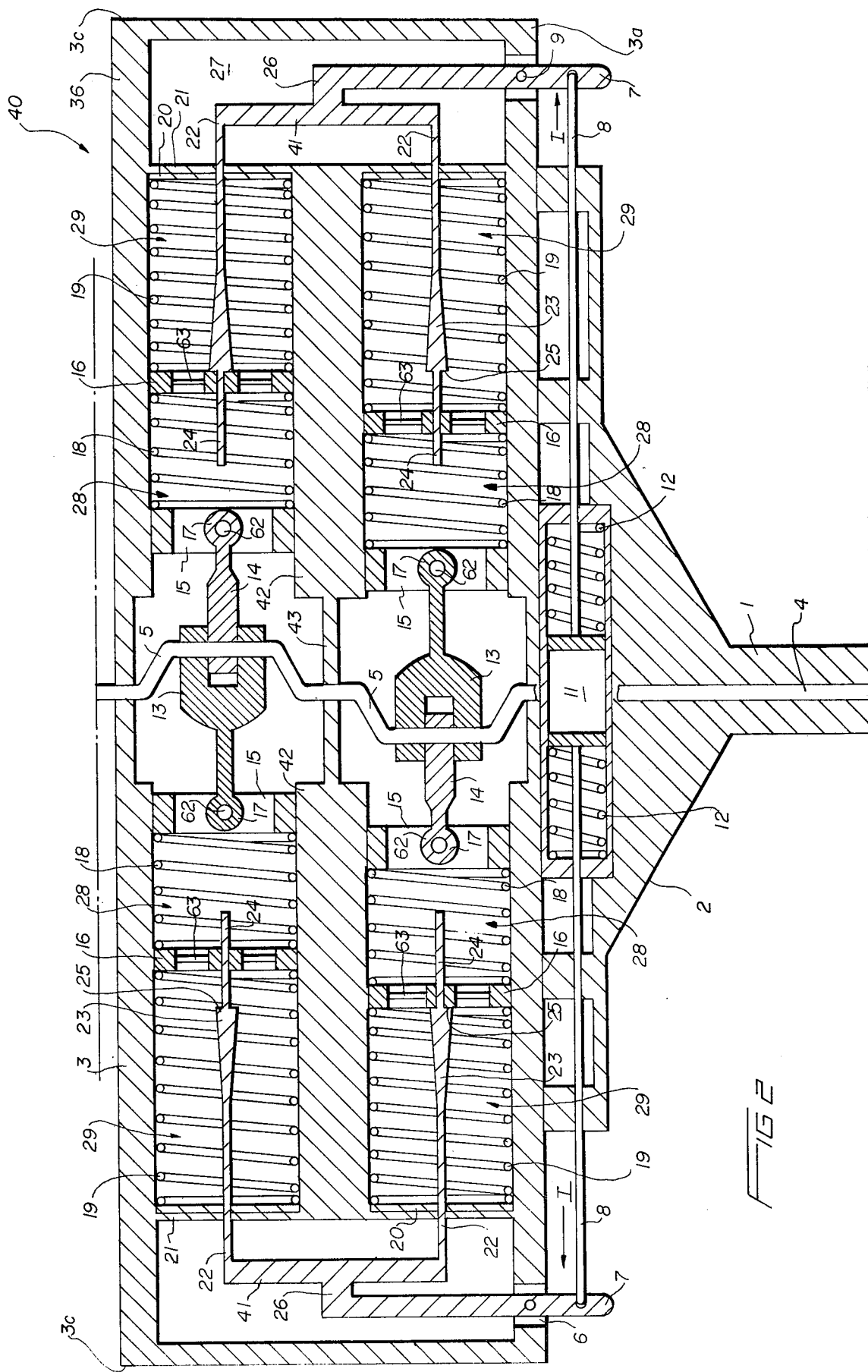

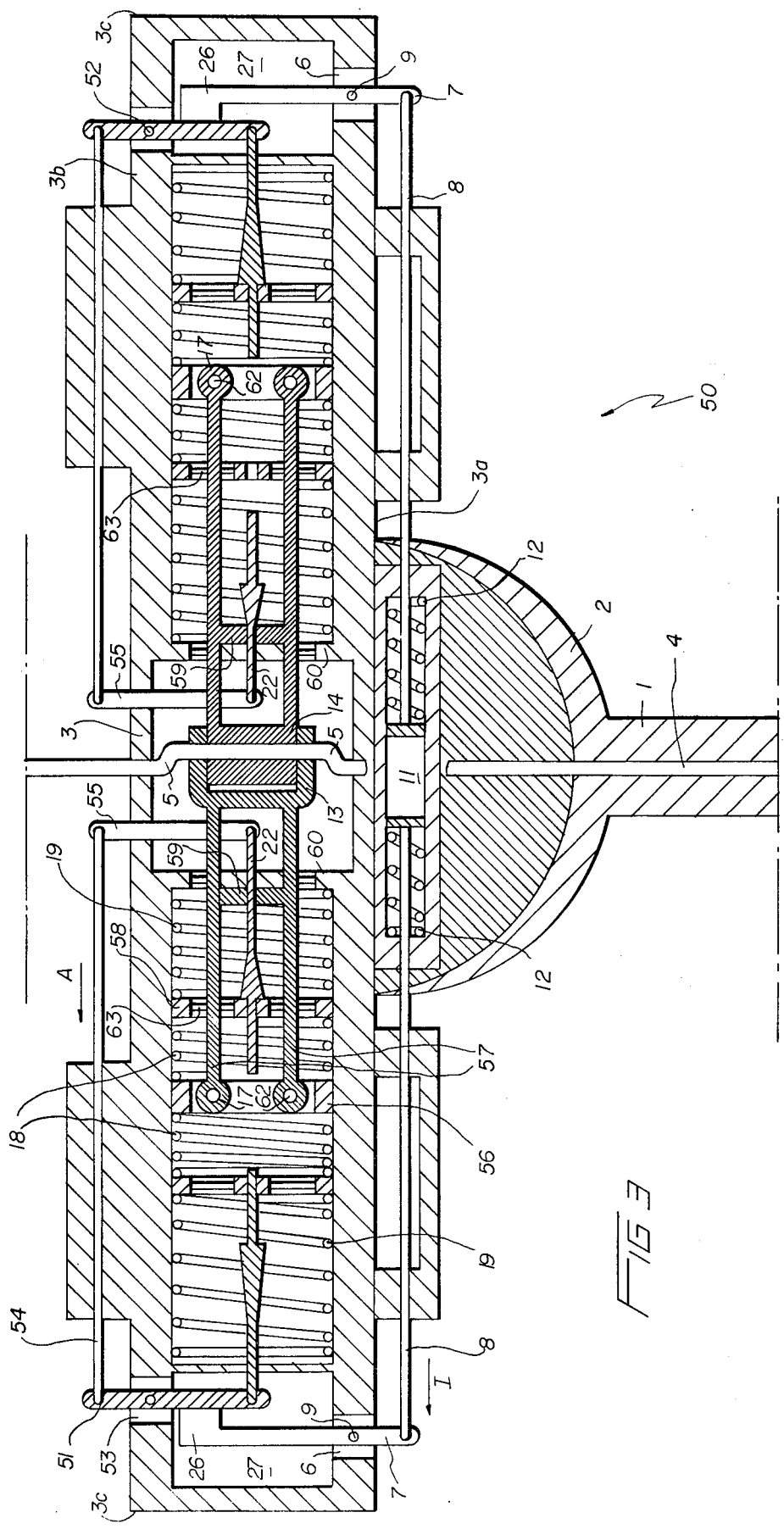

SPRING/PISTON BRAKE DEVICE

BACKGROUND OF THE INVENTION

Perhaps since the invention of the wheel and certainly since the provision of supporting shafts and axles for carrying wheels, man has attempted to control the rate of rotation of the shaft and therefore the wheel by various frictionally engaging devices. Current conventional wisdom provides for a braking device that includes shoes or pads engaging portions of a rotating member in a frictional manner, in combination with a hydraulic or other means for selectively increasing the resistance to rotation, by the frictional engagement in which the rotating energy is transferred into heat. Such prior art devices can be characterized further in the fact that as a function of time, brake linings and the like wear out, surfaces subject to such frictional engagement may tend to warp, the characteristics of the frictional engagement also are sometimes associated with objectional noise, and in some cases the effectiveness of the brake can be compromised when wet, due to a change in the coefficient of friction.

The following U.S. Pat. Nos. reflect the state of the art of which applicant is aware, in so far as these patents appear to be germane to the instant process:

2,001,585 Roeder; 2,499,099 Kenyon; 2,548,919 Stevens et al.; 2,703,219 Henshaw; 3,026,974 Gouker; 3,033,322 Hughes; 3,503,473 Hackett.

Roeder teaches the use of a hydraulic brake in which pistons connected to a crank shaft provide resistance to the shaft rotation because the fluid within which the piston operates is incompressible. Appropriate valving is provided to control this resistance. FIG. 7 suggests the requisite use of brake linings as well.

Stevens and all teaches the use of a hydraulic brake in which frictional engagement between moving parts is required to effect stopping the engaging, areas appearing to be radially disposed about the rotating member.

Henshaw teaches the use of a safety lowering device in which cams disposed upon a shaft coact with piston like members disposed in cylinders having springs, but the true braking is based on the incompressibility of liquid disposed within the cylinder through opening and closing the appropriate valves.

Likewise, Gouker teaches the use of a vehicle brake in which opposed pistons have their motion retarded by means of fluid pressure communicating with piston heads in a cylinder, the fluid pressure altered by means of appropriate valving.

Hughes teaches the use of a braking and retarding apparatus in which a cylinder/piston arrangement provides braking on a rotating shaft by introducing fluid through appropriate valving into the cylinder area opposing motion of the piston somewhat similar to previously discussed references.

The patent to Hackett teaches the use of a fluid braking device in which a piston block includes spring portions, but the primary braking effect occurs by the incompressibility of the fluid and its associated control means, the spring section providing requisite back pressure.

The remaining reference shows the state of the art further.

By way of contrast, the instant application is directed to a device including an eccentric area on a shaft such as a crankshaft, pistons operatively connected thereto, cylinders surrounding the pistons, and plural springs having different spring rates in each cylinder area acting on a face of the piston remote from the shaft, and a means for changing the spring resistance as a function of the desire to control the shaft rotation. Thus, in an unfettered condition, the spring forces in each piston are provided in timed relation, one relative to another, such that any opposing spring force in one piston is offset and countermanded by an opposing spring force in another piston. However, when braking is desired, the spring tension on all springs is changed such that the piston meets substantially increased forces, the magnitude of which can be adjusted depending upon braking needs to retard shaft rotation. Means for changing the spring tension include associated instrumentalities for compressing or relaxing the spring as required.

SUMMARY AND OBJECTS OF THE INVENTION

Accordingly, this invention has as an object to provide a new and novel braking device which obviates the need for the frictional engagement of one member against another.

It is still a further object of this invention to provide a device of the character described above which while using a hydraulic device for changing spring ratios, does not impose extraordinary forces on hydraulic valves and seals as is suggested in the prior art.

It is yet a further object of this invention to provide a device of the character described above which is extremely durable in construction, and safe to use.

It is still yet a further object of this invention to provide a device of the character described above which lends itself to mass production techniques.

A further object comtemplates providing a device of the character described above which is substantially immune to the ravages of the elements, and its performance is not effected by heat build up, dirt or moisture, as is common in the prior art.

These and other object will be made manifest when considering the following detailed specification taken in conjunction with the appended drawing figures.

DESCRIPTION OF THE DRAWING FIGURES

FIG. 1 is a sectional view of a first form of the invention;

FIG. 2 is a sectional view of a second form of the invention; and

FIG. 3 is a sectional view of a third form of the invention.

BRIEF DESCRIPTION OF THE PREFERRED EMBODIMENTS

Referring to the drawings now, wherein like reference numerals refer to like parts thoughout the various drawing figures, reference numeral 10 is directed to a first form of the invention, as best seen in FIG. 1.

The brake for retarding rotation of a powered shaft in its intended environment displays a rear end or differential providing a rotative force to a shaft 4 mounted in a suitable shaft housing 1, the shaft 4 being operatively connected at its output end to a wheel hub for example. Of course, the device could be operatively associated with any type of rotating shaft and the wheel hub and rear end are merely illustrative.

In any event, the shaft housing 1 terminates near one extremity of the shaft into support plate 2 upon which is mounted the piston coil spring brake device 10 of the present invention. The brake device 10 includes a housing 3 having an inner wall 3a mounted to the plate 2 by bolts B, an outer wall 3b proximate to the wheel hub and end walls 3c, the inner wall having openings 6 proximate to the end walls for slidable insertion therein of pivoting levers 7, the levers 7 provided with pivot points 9 fixed to the housing 3.

One end of the lever 7 external of the housing is provided with a actuating shaft 8 which extends into the support plate 2 within which is provided an appropriate hydraulic cylinder 11, the cylinder 11 being illustrated diagramatically since such is well known in the art. The axial translation of the actuating shaft 8 is opposed by means of springs 12, the hydraulic springs 12 urging the rods in an unextended position when there is an absence of hydraulic pressure. Actuation of the shaft 8 occurs when the shaft is moved in direction I as shown in FIG. 1.

The braking housing 3 includes at a central hollow area thereof the rotating shaft 4 having centrally disposed within the brake housing a crank area 5 disposed on the shaft, the crank 5 having operatively associated thereto first and second connecting rods 13, 14, the first connecting rod 13 shown in overlapping relationship, i.e. straddling the second connecting rod 14. Apertured extremities 17 of the connecting rods are provided with wrist pins 62 suitably fashioned to accommodate thereon preferably hollow pistons 15. The brake housing 3 is provided with an inner chamber 27 defining cylinder areas, suitably dimensioned to beneficially allow the pistons 15 to slidably translate therewithin contingent upon machine tolerances, as is well known it the art. Rings may be provided on the piston to effect a better seal between the piston cylinder interface.

A portion of the cylinder area remote from the piston is provided with a partition wall 21 through which a spring control rod 22 extends. As shown, the spring control rod 22 is connected to the lever 7 at an extremity 26 of the lever 7 remote from the actuating shaft 8, the lever extremity 26 being relatively thickened as opposed to the spring control rod. The spring control rod 22 includes an outwardly flared portion 23 along a medial portion thereof, the flared portion having a decreasing stepped shoulder 25 ending in a piston spring control rod terminus 24. The piston ring control rod terminus 24 passes through a hollowed stop disc 16 having a central core connected to the outer disc area through webs 63 which is slidably disposed within the cylinder and dimensioned substantially the same as the piston head 15. Thus, the piston 15, the stop disc 16, the partition wall 21, and the housing 3 together define plural chambers, the first chamber 28, between the piston 15 and the stop disc 16 defining a major chamber 28 within which is disposed a major spring 18, the chamber between the stop disc 16 and the partition 21 defining a minor chamber 29, a minor spring 19 disposed therein and a further chamber where the lever 7 is placed.

Fixed to the spring control rod 22 is a control rod plate 20 which travels with the spring control rod 22 for purposes now be be assigned.

Considering first the operation of the pistons 15 in combination with the crankshaft 5 with only the spring pressure that exists without actuation of the hydraulic device 11, the following observations can be made. Since the pistons are 180° out of phase relative to each other as shown in FIG. 1, translation of each piston in the cylinder area 27 is opposed by the springs contained within the cylinder area, but due to the out of phase relationship of the two pistons, the opposing spring forces are negated and the shaft 4 is substantially free running. It is to be noted that in a preferred form of the invention, the major springs 18 have a greater spring rate than the minor springs 19 i.e. they are much more difficult to compress. Thus, in the mode of free rotation, the major springs are substantially uncompressed and all spring deformation occurs substantially with the minor springs 19.

However, upon energizing the actuating shaft 8 by means of the hydraulic cylinder 11 in the direction of the arrows I, the spring control rods are caused to migrate inwardly due to the geometry of the lever 7 and pivot 9, so that the control rod plate 20 translates inwardly toward the pistons, and the shoulder portion 25 of the spring control rod engages the stop disc 16 and translates the stop disc 16 toward the pistons. When this occurs of course, the pistons are acting on the major spring 18 and not the minor spring 19. The lefthand portion of FIG. 1 shows a constrained position between the stop disc 16 and the shoulder 25 of the outwardly flared portion 23 on the spring control rod 22, and when in this mode, compression of the major spring is brought about, thereby providing greater resistance to the piston's motion. The righthand portion of FIG. 1 shows the alternative when the piston is acting primarily on the minor spring 19, since the force against the major spring 18 is transferred to the minor spring. The piston spring control rod terminus is suitably dimensioned that upon vigorous actuation of the actuating shaft 8, no abutment between the terminus 24 and the piston 15 can occur which could damage the components. Thus, a means for changing the spring rate and the reliance upon different springs within the cylinder has been provided so as to alter the resistance to piston's rotation contingent upon actuation of the hydraulic cylinder 11. The minor springs 19 in use merely take play out of the system. When hydraulic cylinder 11 is actuated, both pistons 15 must work against major springs 18, thereby braking the shaft 4.

FIG. 2 teaches the use of an alternative embodiment 40 in which four pistons are used, two pairs of each being horizontally opposed, similar to FIG. 1. The most salient difference however is that each lever extremity 26 instead of connecting to a single spring control rod 122 connects to a pair of spring control rods 22 by means of intermediate cross beam 41. Moreover, the two pairs of piston assemblies are separated by means of an intermediate wall 42, and the shaft 4 is divided into two crankshaft areas 5 supported and separated from each other by bearings contained on intermediate web 43. Thus, the second embodiment of the piston coil spring brake device reveals an arrangement in which greater braking can be effected. It should apparent that while two pairs of pistons have been displayed, additional piston assemblies can be ganged in greater numbers depending upon the specific job requirements.

FIG. 3 teaches the use of a third embodiment in which the first and second embodiments together comprise a hybridization i.e. the benefits of two pair of piston assemblies have been compressed into a single pair of cylinder and piston assemblies so that the pistons are double acting.

More specifically, the embodiment 50 of FIG. 3 differs from that of FIG. 1 in that the lever extremity 26 is operatively connected to an intermediate cross arm 51 pivoted similarly to the lever 7 and a portion of cross arm 51 extends without the housing through openings 53, and pivoted to the housing by pivot pin 52. The intermediate cross arm 51 is operatively connected to a second actuating shaft 54 so that motion of the first actuating shaft 8 in the direction I causes motion of a second actuating shaft 54 in the same direction as shown by the arrow A. An extremity of the second actuating shaft 54 remote from the intermediate cross arm 51 is connected to a slide arm 55 which translates in the same direction as the arrow A, the slide arm having an extremity remote from the second actuating shaft 54 connected to a spring control rod 22 similar to the other embodiments, but on an opposed face of this same piston 56. Thus, the piston 56 and its motion from left to right and vice versa coact against two major springs 18 and two minor springs 19 thereby doubling the effectiveness. In order to accommodate this embodiment, a special stop disc 58 is provided with connecting rod apertures so as to allow the pair of connecting rod arms 57 to pass therethrough and be ultimately connected to the piston 56. Thus, the connecting rod heads 13, 14 disposed upon the crankshaft 5, provide for a pair of connecting rod arms as shown. Moreover, the connecting rod arms 57 are further braced by a connecting rod web 59 surrounding the spring control rod 22 for greater rigidity. Thus, motion of the piston along the length of the cylinder provides a double acting environment. Clearly, this third embodiment of FIG. 3 could be suitably ganged as shown in FIG. 2 so that plural double acting pairs of brake assemblies can be provided, based on the foregoing teaching. Similar to partition wall 21, a cap 60 is provided opposed from partition wall 21 to key the double acting springs nearest the crank 5 within the cylinder. It is contemplated that all linkages, levers, cranks and moving parts are lubricated preferably in highly viscous oil or the like.

In view of the foregoing, it should be apparent that numerous structural modification are contemplated as being a part of this invention as set forth hereinabove and as defined hereinbelow by the claims.

What is claimed:

1. A brake for retarding rotation of a powered shaft comprising in combination:
    a crankshaft means disposed on a section of said shaft,
    piston means operatively disposed on said crankshaft means, said piston means slidably positioned in cylinder means defined by a chamber within which said piston means is slideably disposed, said chamber having a partition wall at an extremity remote from said piston means,
    damping means disposed in said cylinder means remote from said shaft adapted to brake said shaft by retarding piston motion wherein said chamber has provided therein at least one major spring defining said damping means and said chamber includes a minor spring operating in concert with said major spring, said major and minor springs separated by means of a stop disc interposed therebetween,
    and means for increasing said damping means to increase the braking rate wherein said means for increasing said damping means includes a hydraulic cylinder, an actuating shaft operatively connected to said hydraulic cylinder, a lever connected to said actuating shaft remote from said hydraulic cylinder including a lever extremity provided with a spring control rod extending through said partition wall and through said stop disc, said spring control rod having an outwardly flared portion including a stepped shoulder adapted to abut against said stop disc, whereby one of said springs can be relatively disengaged from compression by means of said piston means.

2. The brake of claim 1 wherein said spring control rod includes a piston spring control rod terminus extending through an aperture in said stop disc.

3. The brake of claim 2 wherein said spring control rod has affixed thereto a control rod plate proximate to said partition wall to serve as a stop member for said spring control rod in passage through said partition wall.

4. The brake of claim 3 wherein said piston means comprises first and second pistons operatively disposed on said crankshaft 180° out of phase.

5. The brake of claim 4 wherein each said piston means is double acting, and includes an interim cross arm operatively disposed and interposed between said lever extremity and said spring control rod, said interim cross arm pivotally attached to said housing and a portion of which extends outwardly therefrom, a second actuating shaft connected to an extremity of said interim cross-arm remote from said lever extremity, a slide arm operatively connected to said second actuating shaft whereby translation of said first actuating shaft moves said slide arm, said slide arm extending within said housing and operatively connected to a further spring control rod acting on said piston means in a direction opposite from said first named spring control rod, said piston means disposed therebetween, and a further major spring on a side of said piston means opposed from the other major spring, a further minor spring disposed on a side remote from said other minor spring, a cap member containing said springs within said cylinder whereby motion of said piston means in either direction in said cylinder is provided with spring opposition.

6. The brake of claim 4 in which plural pairs of opposed pistons are disposed in housings ganged together to increase the braking effect.

* * * * *